United States Patent [19]
Bauer et al.

[11] Patent Number: 5,244,275
[45] Date of Patent: Sep. 14, 1993

[54] ELECTRICALLY POWERED FOOD PROCESSING APPARATUS

[75] Inventors: Alfred Bauer, Neu Isenburg; Georg Börger, Steinbach; Karl-Heinz Kamprath, Wiesbaden, all of Fed. Rep. of Germany

[73] Assignee: Braun Aktiengesellschaft, Frankfurt, Fed. Rep. of Germany

[21] Appl. No.: 876,353

[22] Filed: Apr. 30, 1992

[30] Foreign Application Priority Data

May 11, 1991 [DE] Fed. Rep. of Germany ....... 4115471

[51] Int. Cl.$^5$ ............................................. B01F 15/06
[52] U.S. Cl. ...................... 366/314; 99/495; 99/510; 241/92; 310/50; 310/58; 361/694; 366/601
[58] Field of Search .............. 99/486, 495, 509, 510, 99/517; 366/197-199, 314, 601; 361/384; 310/58, 59, 47, 50; 241/36, 37.5, 92, 101.1; 388/936

[56] References Cited

U.S. PATENT DOCUMENTS

| | | | |
|---|---|---|---|
| 2,870,351 | 1/1959 | Orchard | 310/59 |
| 3,224,826 | 12/1965 | Kemnitz | 310/50 |
| 3,550,657 | 12/1970 | Swanke | 366/601 |
| 3,809,325 | 5/1974 | Marrie | 366/601 |
| 3,815,172 | 6/1974 | Fromknect et al. | 310/58 |
| 4,071,789 | 1/1978 | Ernster et al. | 310/50 |
| 4,309,631 | 1/1982 | Christensen | 310/50 |
| 4,422,343 | 12/1983 | Falkenbach et al. | 241/101.1 |
| 4,716,823 | 1/1988 | Capdevila | 99/510 |
| 4,797,782 | 1/1989 | Wistling | 361/384 |
| 5,031,518 | 7/1991 | Bordes | 366/314 |

FOREIGN PATENT DOCUMENTS

| | | | |
|---|---|---|---|
| 606578 | 10/1960 | Canada | 310/50 |
| 170187 | 6/1905 | Fed. Rep. of Germany . | |
| 831114 | 7/1949 | Fed. Rep. of Germany . | |
| 1098171 | 1/1957 | Fed. Rep. of Germany . | |
| 1103531 | 5/1959 | Fed. Rep. of Germany . | |
| 1613263 | 8/1967 | Fed. Rep. of Germany . | |
| 468737 | 3/1969 | Fed. Rep. of Germany . | |
| 8302564.2 | 1/1983 | Fed. Rep. of Germany . | |
| 3408693 | 3/1984 | Fed. Rep. of Germany . | |
| 3430023 | 8/1984 | Fed. Rep. of Germany . | |
| 3446859 | 12/1984 | Fed. Rep. of Germany . | |
| 59-136043 | 8/1984 | Japan . | |
| 1473097 | 4/1989 | U.S.S.R. | 361/384 |
| 745575 | 2/1956 | United Kingdom | 310/50 |

Primary Examiner—Timothy F. Simone
Attorney, Agent, or Firm—Fish & Richardson

[57] ABSTRACT

The invention is directed to an electrically powered food processing apparatus for processing and preparing any type of food, receiving in a housing (1) an electric motor (8) rotating a processing tool located in a working vessel for processing the food material. The electric motor (8) is supplied with cooling air by means of a motor-driven impeller (38) rotatably arranged in the housing (1), and the electric motor (8) and the impeller (38) are disposed in an air duct (4) providing at its one end an air inlet (45) and at its other end an air outlet (46). To obtain a food processor of a construction as compact as possible, yet with a high motor output rating, while at the same time motor noise is reduced, the impeller (38) is driven by an additional electrically powered impeller motor (30) arranged in the housing (1) separate from the electric motor (8), and the impeller motor (30) is not connected to the supply until a predeterminable power input of the electric motor (8) is exceeded.

16 Claims, 1 Drawing Sheet

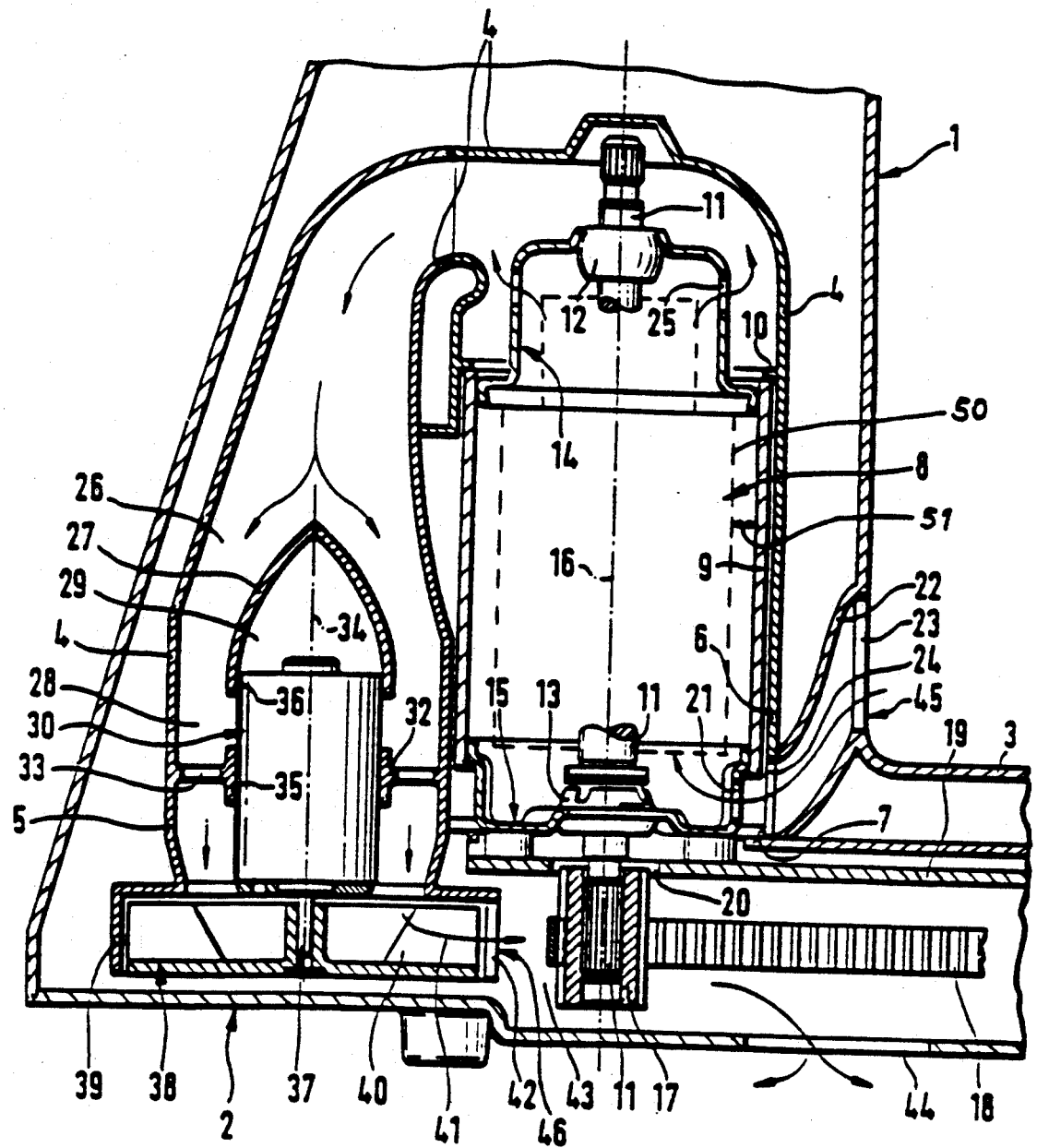

ELECTRICALLY POWERED FOOD PROCESSING APPARATUS

This invention relates to an electrically powered food processing apparatus for processing and preparing any type of food, including an electric motor arranged in a housing and rotating a processing tool located in a working vessel for processing the food material, the electric motor being supplied with cooling air by means of a motor-driven impeller rotatably arranged in the housing, with the electric motor and the impeller being disposed in an air duct providing at its one end an air inlet and at its other end an air outlet.

BACKGROUND OF THE INVENTION

A food processing apparatus of the type initially referred to is known, for example, from DE-A 34 08 693. In this food processing apparatus, the electric motor vertically disposed in the motor housing operates via a gear arrangement comprised of two gears and a toothed belt to drive a processing tool adapted to be coupled to a driven shaft and rotating in a working vessel, thus cutting, mixing, kneading, etc. The food material contained in the working vessel, depending on the type of processing tool employed. While the first gear which conventionally has the smaller diameter is connected with the drive shaft of the electric motor in a non-rotating relationship, the second gear is mounted on the driven shaft receiving the processing tool. To produce cooling air, air-directing blades are provided on the second gear which combine with that gear to form the impeller. In this arrangement, the impeller produces a greater or lesser amount of cooling air, in dependence upon the rotational frequency of the electric motor, that is, the higher the rotational frequency of the electric motor, the more cooling air is supplied to the electric motor.

It is a generally known fact in electric motors that their rotational frequency drops significantly if high power demands are made on them, while their rotational frequency increases when the torques to be delivered are small. The rotational frequency of the impeller being dependent on the electric motor, the cooling air stream of the impeller diminishes precisely at a moment when high power losses demand increased cooling of the electric motor. Conversely, the impeller delivers very high amounts of air when power losses are low, that is, when the electric motor has a low power output or operates at no-load, although this condition does not call for intense cooling of the electric motor.

As a result of such shortcomings, only very brief operating periods can be achieved at high load torques and low rotational frequencies, because the air stream produced by the impeller does not, as a rule, suffice to cool the electric motor, unless an electric motor with considerably larger dimensions is used, which would significantly add to the cost of the food processing apparatus. On the other hand, when the electric motor runs at no-load speed, the disadvantage results that the motor is cooled to an unnecessarily high degree. This produces very loud running and air noise, particularly at no-load.

From DE 34 30 023 A1 a drilling machine is known in which the drive motor is cooled by an impeller driven by an additional impeller motor. In this disclosure, the rotational frequency and thus the cooling power of the additional impeller motor are controlled in dependence upon the operating temperature of the electric motor by means of a temperature sensor. In this type of control of cooling power, it is a disadvantage that the temperature measured at the measuring point of the temperature sensor may appreciably lag behind the actual temperature of the motor winding. Thus, when the power demanded from the motor rises rapidly, undesired or even hazardous temperature peaks may occur at the windings before these are reduced again by the impeller motor delivering an increased cooling power.

It is therefore an object of the present invention to provide a food processing apparatus for domestic use which eliminates the above-mentioned disadvantages, builds to compact dimensions in spite of relatively high motor power, in which motor noise is reduced considerably, and which affords high-efficiency cooling.

SUMMARY OF THE INVENTION

According to the present invention, this object is accomplished in that the impeller is driven by an additional electrically powered impeller motor provided in the housing separate from the electric motor, that the impeller motor with its impeller are arranged in the air duct subsequent to the electric motor when viewed in the direction of air flow from the air inlet to the air outlet, that the air duct is of a U-shaped configuration, and that the electric motor and the impeller motor are arranged in a respective arm of the U-shaped air duct. The additional impeller motor enables the electric motor to be built to very small dimensions while producing comparatively high power, because the high heat developing under overload conditions is carried away rapidly and efficiently by the impeller motor and the impeller. A food processing apparatus is thus obtained combining a particularly light and compact construction with high power, which has an especially beneficial effect, as when handling the food processing apparatus.

The additional impeller motor further enables the motor noise produced by the cooling air to be maintained low at low load torques, that is, at high rotational frequencies. Particularly intense cooling of the electric motor with a minimum of flow resistance is accomplished by arranging the impeller motor with its impeller in the air duct subsequent to the electric motor, when viewed in the direction of air flow from the air inlet to the air outlet. By virtue of this arrangement, the impeller thus aspirates cooling air through the air inlet into the interior of the electric motor and past the impeller motor to the air outlet. A particularly compact construction of the food processing apparatus is accomplished by the U-shaped configuration of the air duct, with the electric motor and the impeller motor being arranged in a respective arm of the U-shaped air duct. This arrangement further affords ease of mechanized assembly of the drive motors in the air duct, enabling it to mount the motors vertically side by side on the base of the food processing apparatus.

To provide for circulation of the cooling air stream also around the impeller motor while at the same time high rates of cooling air flow are accomplished, in a further aspect of the present invention the impeller motor is arranged in the air duct intermediate the impeller and the electric motor. By suitably configuring the cross-section of the air duct in the area of the impeller motor, it is possible to attain a flow rate at the impeller motor which is of a magnitude sufficient to rapidly dissipate also the power loss occurring at the impeller motor in the form of heat. Owing to the suction effect, the cooling efficiency of the food processing apparatus can be increased considerably.

In order to obtain a particularly short air duct, the electric motor advantageously includes a rotor rotating in a stator frame, the clearance formed between the rotor and the stator frame of the electric motor forms part of the air duct, and the impeller is arranged proximate to the air outlet. The actual air duct in which the impeller motor with its impeller are arranged thus extends from the stator frame at the end opposite the air inlet of the electric motor. As a result, a housing of reasonable height and length is obtained in which the weight is more evenly distributed.

Advantageously, the air inlet is provided laterally on the housing, and the air outlet is provided in the proximity of the bottom plate of the food processing apparatus. Because the cooling air exits the housing of the food processing apparatus in various directions, the heated cooling air is prevented from mixing with the cooling air drawn in which is still cold. Where the impeller is of the radial fan type, it may be integrated in an already existing air duct with particular ease, because the air duct is manufactured of plastics in an injection-molding die. Radial type impellers are of particularly slim construction, generating high flows of cooling air at high rotational frequencies. High rotational frequencies are not unusual in the impeller motors herein used, that is, electric motors of small size.

By arranging processing tool, electric motor and impeller motor so that their respective axes lie on an approximately common plane, it is possible to reduce the width of the food processing apparatus to a minimum. Equally, a configuration involving a minimum of angles will then result for the housing of the air duct. The provision of mounting means for the electric motor and the impeller motor in the air duct obviates the need for additional fastening means to secure the drive motor and the impeller motor in the housing of the air duct.

Another aspect of the present invention provides for a transmission means between the impeller motor and the impeller. The transmission means permits an optimum adaptation of the cooling air necessary for the electric motor at given specifications of an impeller motor.

In still another aspect of the present invention, the impeller motor and the electric motor are electrically interconnected such that an increase in the load torque of the electric motor produces an increase in the cooling power delivered by the impeller motor.

In consequence, the impeller motor is not connected to the supply until the electric motor is heated to a degree necessitating its cooling. For example, if the electric motor runs at no-load speed, additional cooling of the electric motor is not necessary in the majority of cases, because the power loss occurring in the electric motor does not appreciably heat the electric motor. In this case, the armature current flowing through the impeller motor is so low that the impeller motor does not start or, if it does, it runs at a very low rotational frequency, so that practically no cooling air noise develops on the impeller, as a result of which the food processor runs very quietly. By contrast, if the power of the electric motor and accordingly the amount of heat it gives off increase, the impeller motor will run at a corresponding rotational frequency.

A power-dependent, continuous control of the rotational frequency of the impeller motor is accomplished as follows: The higher the load torque, that is, the heat emitted on the electric motor, the higher the current that flows through the impeller motor which, running at no-load, correspondingly increases its rotational frequency thus producing an increased cooling power. This enables the food processing apparatus to give continuous operation also with the electric motor running at maximum power, without running the risk of a thermal overload occurring on the electric motor.

Advantageously, both the electric motor and the impeller motor are series-connected direct-current motors, so that the same armature current flows through both motors, and the rated voltage of the impeller motor is substantially lower than that of the electric motor. In the use of direct-current motors in which only a very small clearance is provided between the rotor and the stator frame, it is particularly advantageous if the cooling air is drawn in from the air inlet through the electric motor to the radial impeller. Unlike air which is pressed through, air drawn in through the air duct largely eliminates the swirl in the air stream and thus prevents flow losses, which improves the cooling efficiency of the food processor considerably. By virtue of the substantially lower rated voltage of the impeller motor, the current input of the drive motor essentially determines the total current flowing through both motors. The rotational frequency of the impeller motor is thus dependent on the power input of the drive motor, that is, the cooling power increases when the armature current of the drive motor increases with the load torque increasing. Correspondingly, the rotational frequency and thus the cooling power of the impeller motor will decrease when the load torque at the drive motor and thus its armature current decrease.

DESCRIPTION OF PARTICULAR EMBODIMENT

An embodiment of the present invention will now be described in more detail in the following with reference to the sole FIGURE of the accompanying drawing.

The sole FIGURE of the drawing represents a fragmentary view, in longitudinal section, of a motor housing of a multi-purpose food processing apparatus.

The housing 1 receiving the motor drive mechanism extends in the left-hand outer portion from its bottom plate 2 upwardly in conically tapering fashion, while extending in its right-hand portion substantially normal to the bottom plate 2. While the conically tapering portion of the housing 1 terminates flush with the outer end of the substantially horizontally extending bottom plate 2, that is, it is sealed thereto in an at least dust-proof manner, the right-hand portion of the housing 1 continues with its bottom section in a horizontal portion 3 which extends to the right above and in a spaced relationship to the bottom plate 2.

Between the two walls of the housing 1, an air duct 4 is formed extending in the interior essentially upwardly from the bottom plate 2 in a substantially U-shaped configuration, such that its two free arms 5, 6 are directed towards the bottom plate 2. The arm 6 has at its free end a circular opening 7 into which the electric motor 8 is inserted from below. The tubular stator frame 9 of the electric motor 8 is inserted into the tubular free arm 6 of the air duct until its upper free end is in abutting engagement with an annular collar 10 provided in the interior of the free arm 6. Extending through the electric motor 8 is a drive shaft 11 forming at the same time the rotor (not shown) provided with windings. The drive shaft 11 has its upper and lower end rotatably carried in a respective calotte bearing 12, 13 held in a respective end shield 14, 15 fixedly connected with the stator frame 9. The line drawn between the two end shields 14, 15 forms the bearing axis or center line 16 of the electric motor 8.

The lower end of the drive shaft 11, when viewing the drawing, is provided with a pinion 17 having its periphery in mesh with a toothed belt 18. The toothed belt 18 extends from the pinion 17 to the right when viewing the drawing and is connected to a gear, not shown, to which a driven shaft is attached. The driven shaft is rotatably carried in a supporting plate 19 formed between the housing portion 3 and the bottom plate 2 and extends upwardly through the housing portion 3 through an opening not shown in the drawing. In a first embodiment, the driven shaft may extend into the interior of a working vessel adapted to be placed down on the housing portion 3, in which vessel push-on processing tools may be coupled to the shaft in a manner preventing relative rotation. In another embodiment, a further drive shaft carried in the bottom of the working vessel may be provided which is adapted to be coupled by a coupling means to the driven shaft connected to the second gear. In this embodiment, too, the working vessel is fixedly held in position relative to the processing tools when in operation by means of a centering device provided on the housing portion 3. Inside the working vessel, the drive shaft has attached to it another coupling means onto which the appropriate processing tools are seatable for coupling engagement therewith in a manner preventing relative rotation (not shown).

The supporting plate 19 is attached to the housing 1 of the food processor at fastening points not shown in the drawing, extending substantially parallel to the bottom plate 2. At the left-hand end of the supporting plate 19, fastening means not shown in the drawing are provided to which the electric motor 8 is firmly flanged. A bore 20 provided in the supporting plate 19 serves for passage of the free end of the drive shaft 11, to provide for engagement of its pinion 17 with the toothed belt 18 underneath the supporting plate 19.

In the FIGURE, inlet openings 21 are provided in the lower end shield 15 which are in fluid communication with a supply channel 22 extending from the lower right-hand circumference of the free arm 6 of the air duct 4. The supply channel 22 is integrally formed with the right-hand wall of the housing 1 and connected to atmosphere through slots 23 provided in the wall. In this embodiment, the slots 23 are illustrated in the plane of the drawing, in actual fact, however, they are not provided in the wall area proximate to the vessel, but in the exposed end wall of the food processor. The supply channel 22 is in sealed engagement with an inlet opening 24 formed on the free arm 6 of the air duct 4.

Air exit openings 25 are provided on the upper end shield 14, when viewing the drawing. From this location, the air duct 4 curves to the left, subsequently continuing downwardly again when viewing the drawing, so that a U-shaped configuration of the air duct 4 results. A chamber 26 formed by the free arm 5 of the air duct 4 accommodates a conical partition wall 27 causing the circular cross-section of the air duct 4 upstream from the partition to change into an annular cross-section, so that the free space 29 of circular cross-section enclosed by the annular chamber 28 serves to receive the impeller motor 30. The partition wall 27 tapering conically outwardly in downward direction further has the advantage that the impeller motor 30 presents little air resistance to the air stream.

Below the partition wall 27, radially inwardly extending brackets 32 are formed on the wall of the air duct 4 and are provided with passageways 33 for passage of air in downward direction. The brackets 32 directed radially to the center line 34 of the impeller motor 30 terminate in an annular sleeve 35 interconnecting the brackets 32, and the impeller motor 30 is inserted into the annular sleeve from below until its upper free end, when viewing the drawing, is centered in the receiving opening 36 of the partition wall 27. The diameter of the annular sleeve 35 is selected such as to provide a press fit for the impeller motor 30 seated therein. The impeller 38 is attached to the shaft 37 projecting downwardly from the impeller motor 30. The outer periphery of the radial-fan type impeller 38 is surrounded by an annular guard 39 of a diameter greater than the inside diameter of the annular chamber 28. The radial-fan type impeller 38 is equipped with air-directing walls 40 moving the air from the annular chamber 28 radially in the direction of the arrow 41 to the bottom plate 2. While the slots 23 form the actual air inlet 45 of the air duct 4, the opening 42 forms the actual air outlet 46.

The mode of operation of the food processing apparatus of the invention is as follows:

When the electric motor 8 is energized, the pinion 17 attached to the rotor 50 of the drive shaft 11 drives the toothed belt which in turn rotates the driven shaft, not shown in the drawing, and consequently the processing tool in the working vessel. As long as the electric motor 8 is operated at a low load torque only, consequently generating no appreciable heat, only a low armature current flows through the impeller motor. As a result, the impeller motor 30 either remains at standstill or rotates at a very low speed only. As the load torque and thus the temperature on the electric motor 8 increase, a circuit arrangement not shown in the drawing brings the impeller motor 30 to a rotational frequency generating a corresponding cooling power.

Air is then aspirated through the slots 23 provided in the end wall of the food processor to the inlet openings 21 and onwards into the annular chamber 51 of the electric motor 8, the air becoming heated on the heated windings of the rotor 50 in the electric motor 8 and exiting from the electric motor 8 through the air exit openings 25. Directed by the air duct 4, the heated air then flows along the partition wall 27 and the impeller motor 30 through the passageways 33 to the radial-fan type impeller 38 where it is deflected radially outwardly and conveyed through an opening 42 provided in the guard 39 into the gear compartment 43 underneath the motor 8, where it is ultimately discharged to atmosphere downwardly through the exit openings 44 provided in the bottom plate 2 to the base not shown in the drawing.

For improved clarity of illustration of the air guiding in the air duct, air-directing arrows 41 are shown in the drawing As soon as the load torque drops below a predetermined value, the impeller motor 30 is either de-energized completely or operated at reduced speed, so that practically only the noise produced by the electric motor can be heard.

We claim:

1. An electrically powered food processing apparatus for processing and preparing food comprising housing structure, air duct structure of U-shaped configuration in said housing structure, said air duct structure having an air inlet, an air outlet, and two arm portions between said air inlet and said air outlet, an electric motor disposed in said housing structure in one of said air portions, drive structure coupled to said electric motor for rotating a food processing tool, impeller structure rotatably arranged in said housing structure for supplying said electric motor with cooling air, and an additional electrically powered impeller motor disposed in said air duct structure in the other of said arm portions subsequent to said electric motor when viewed in the direction of air flow from said air inlet to said air outlet and coupled in driving relation to said impeller structure.

2. The food processing apparatus of claim 1 wherein said impeller motor is arranged in said air duct structure intermediate said impeller structure and said electric motor.

3. The food processing apparatus of claim 2 wherein said electric motor includes a stator frame and a rotor rotating in said stator frame, clearance between said rotor and said stator frame of said electric motor forming part of said air duct structure, and said impeller being arranged proximate to said air outlet.

4. The food processing apparatus of claim 1 wherein said hosing structure includes a bottom plate, said air inlet is provided laterally on said housing structure, and said air outlet is in the proximity of said bottom plate.

5. The food processing apparatus of claim 1 wherein said impeller structure is of the radial fan type.

6. The food processing apparatus of claim 1 wherein the axes of said electric motor and said impeller motor are arranged on an approximately common plane.

7. The food processing apparatus of claim 1 and further including transmission means between said impeller motor and said impeller structure.

8. The food processing apparatus of claim 1 and further including mounting structures for said electric motor and said impeller motor in said air duct structure.

9. The food processing apparatus of claim 8 wherein said air duct structure is composed of two half shells.

10. The food processing apparatus of claim 1 wherein said impeller motor and said electric motor are electrically interconnected such that an increase in the load torque of said electric motor produces an increase in the cooling power delivered by said impeller motor.

11. The food processing apparatus of claim 1 wherein both said electric motor and said impeller motor are series-connected direct-current motors and are interconnected so that the same armature current flows through both of said motors, and the rated voltage of said impeller motor is substantially lower than that of said electric motor.

12. The food processing apparatus of claim 11 wherein said impeller motor is arranged in said air duct structure intermediate said impeller structure and said electric motor.

13. The food processing apparatus of claim 12 wherein said electric motor includes a stator frame and a rotor rotating in said stator frame, clearance between said rotor and said stator frame of said electric motor forms part of said air duct structure, and said impeller structure is arranged proximate to said air outlet.

14. The food processing apparatus of claim 13 wherein said housing structure includes a bottom plate, said air inlet is provided laterally on said housing structure, said air outlet is in the proximity of said bottom plate, and said impeller structure is of the radial fan type.

15. The food processing apparatus of claim 12 wherein the axes of said electric motor and said impeller motor are arranged on an approximately common plane.

16. The food processing apparatus of claim 15 wherein said impeller motor and said electric motor are electrically interconnected such that in increase in the load torque of said electric motor produces an increase in the cooling power delivered by said impeller motor.

* * * * *

UNITED STATES PATENT AND TRADEMARK OFFICE
CERTIFICATE OF CORRECTION

PATENT NO.  : 5,244,275

DATED       : September 14, 1993

INVENTOR(S) : Bauer, et al.

It is certified that error appears in the above-identified patent and that said Letters Patent is hereby corrected as shown below:

Claim 1, column 7, line 7, replace "air" with --arm--

Claim 4, column 7, line 31, replace "hosing" with --housing--;

Claim 16, column 8, line 40 (first occurrence) replace "in" with --an--;

Signed and Sealed this

Eleventh Day of February, 1997

BRUCE LEHMAN

Attest:

Attesting Officer

Commissioner of Patents and Trademarks